United States Patent [19]

Uchida et al.

[11] Patent Number: 5,580,119
[45] Date of Patent: Dec. 3, 1996

[54] DOOR FOR AUTOMOTIVE VEHICLES

[75] Inventors: Katsuyoshi Uchida, Sagamihara; Kimie Matano, Atsugi; Hidetoshi Sokusai, Hadano, all of Japan

[73] Assignee: Nissan Motor Co., Ltd., Yokohama, Japan

[21] Appl. No.: 384,891

[22] Filed: Feb. 7, 1995

[30] Foreign Application Priority Data

Feb. 25, 1994 [JP] Japan ................................. 6-028185

[51] Int. Cl.⁶ ........................................................ B60J 5/04
[52] U.S. Cl. ...................... 296/146.6; 296/188; 296/189; 49/502
[58] Field of Search ............................ 296/146.5–146.7, 296/189; 280/751; 49/501, 502

[56] References Cited

U.S. PATENT DOCUMENTS 5,395,135  3/1995  Lim et al. ........................ 296/189 X

FOREIGN PATENT DOCUMENTS

| 2-64422 | 5/1990 | Japan . | |
|---|---|---|---|
| 4362415 | 12/1992 | Japan | 296/189 |
| 6191275 | 7/1994 | Japan | 296/146.6 |
| 1441598 | 7/1976 | United Kingdom | 280/751 |

*Primary Examiner*—Dennis H. Pedder
*Attorney, Agent, or Firm*—Lowe, Price, LeBlanc & Becker

[57] ABSTRACT

A door for automotive vehicles comprises an inner panel formed with a work opening in a position corresponding to a door pad. The work opening has a front edge positioned ahead of a front end of the door pad, a rear edge positioned behind a rear end of the door pad, and an upper edge positioned above an upper end of the door pad. The door pad has a lower edge inserted into a groove at the bottom of the door.

6 Claims, 4 Drawing Sheets

DOOR FOR AUTOMOTIVE VEHICLES

FIELD OF THE INVENTION

The present invention relates to a door for automotive vehicles.

BACKGROUND OF THE RELATED ART

Various types of doors for automotive vehicles have been proposed in past years. One of conventionally proposed doors is disclosed, for example, in JP-U 2-64422.

However, such conventional doors are constructed so that when a predetermined external force is applied thereto, a door pad pushed by an outer panel comes in contact with an inner panel so as not to move on the side of a vehicle room, having limited door deformation margin as well as limited absorbable energy amount. Further, under such door construction, it cannot be expected that a trim pad produces sufficient deformation. Furthermore, due to numerous work openings being arranged, the inner panel has increased thickness for ensuring the strength thereof.

SUMMARY OF THE INVENTION AND PRINCIPAL

It is, therefore, an object of the present invention to provide a door for automotive vehicles which contributes to an increase in the absorbable energy amount without increasing the thickness of a panel.

According to the present invention, in a preferred embodiment there is provided a door for an automotive vehicle, the automotive vehicle having a vehicle room and a seat occupant, comprising:

a door main body including an outer panel and an inner panel;

a guard bar arranged in said door main body in said longitudinal direction thereof;

a door pad arranged in said door main body in a position corresponding to the seat, said door pad having front, rear, upper and lower ends, said lower end of said door pad being inserted into a groove of a bottom of said door main body;

a mounting lug arranged to said door pad at an upper end thereof, said mounting lug being mounted to said guard bar; and means for defining an opening corresponding to said door pad, said opening defining means having a front edge positioned ahead of said front end of said door pad, a rear edge positioned behind said rear end of said door pad as viewed in the longitudinal direction, and an upper edge positioned above said upper end of said door pad.

DETAILED DESCRIPTION OF THE PREFERRED EMBODIMENTS

Figure 1:
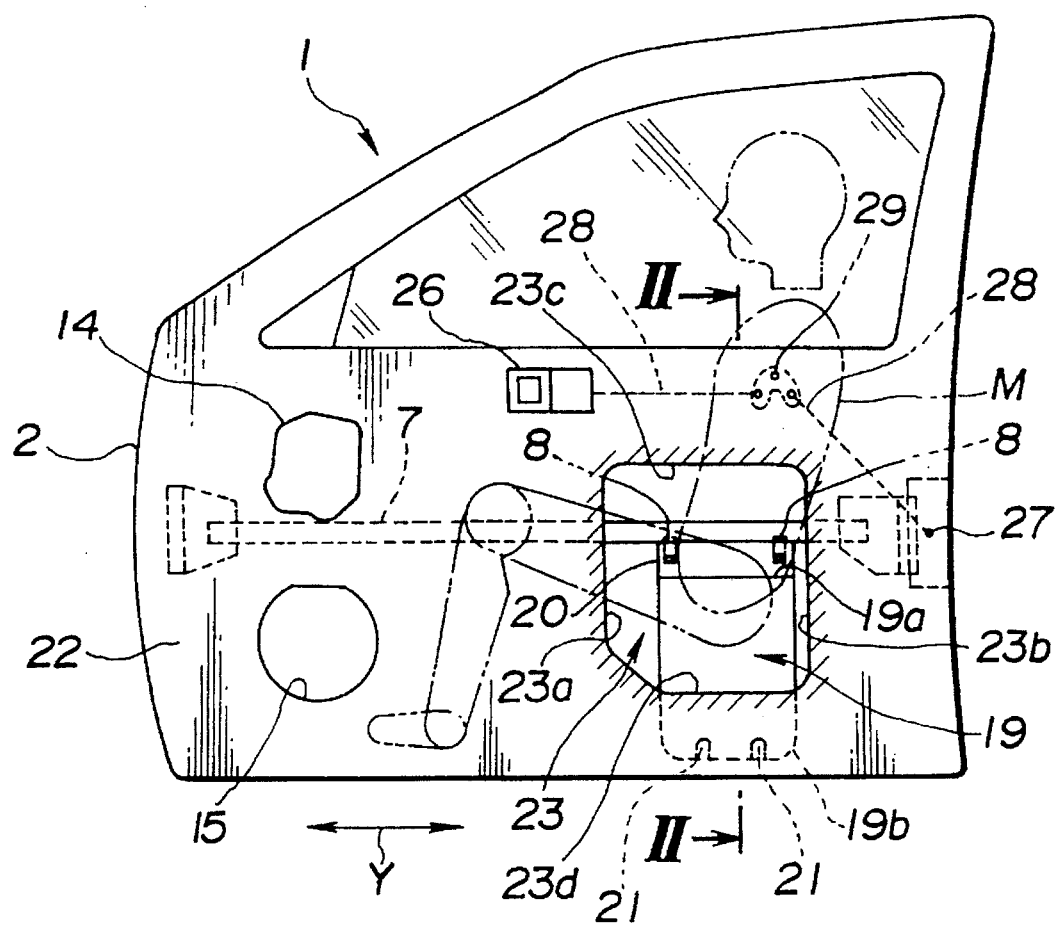
FIG. 1 is a side view of a preferred embodiment of a door for automotive vehicles according to the present invention.

Referring to the drawings, wherein like reference numerals designate like parts throughout the views, a preferred embodiment of the present invention will now be described.

Figure 5:
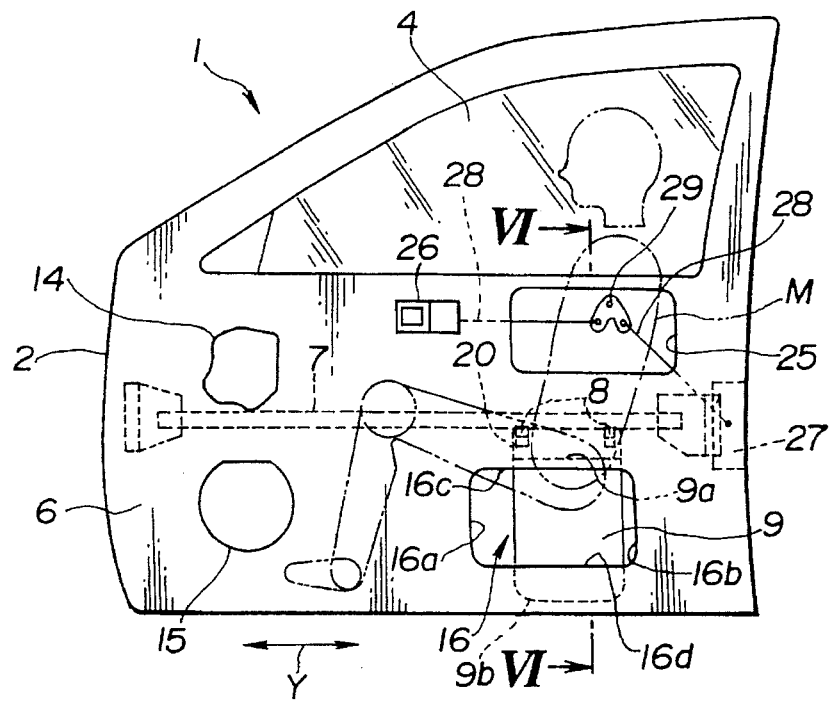
FIG. 5 is a view similar to FIG. 1, showing a conventional door for automotive vehicles.
Figure 6:
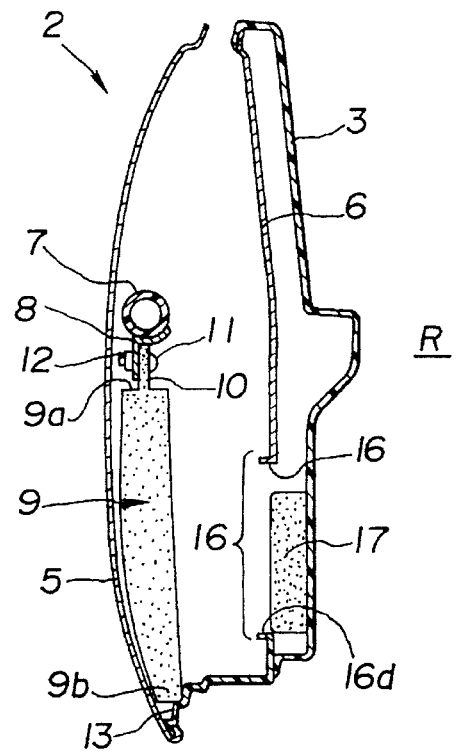
FIG. 6 is a view similar to FIG. 4, taken along the line VI—VI in FIG. 5.
Figure 7:
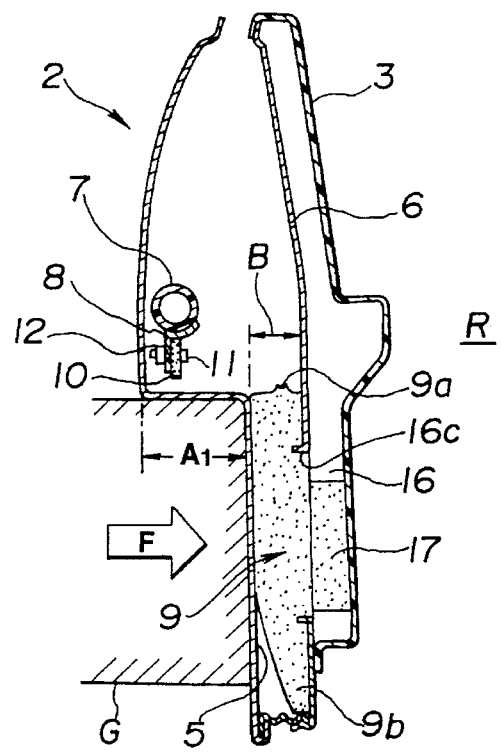
FIG. 7 is a view similar to FIG. 6, showing the door pad crushed.

Referring to FIGS. 5–7, before describing the preferred embodiment of the present invention, a detailed description will be made with regard to a conventional door for automotive vehicles.

Referring to FIG. 5, a door, designated generally by reference numeral 1, comprises a door main body 2, a door trim 3, and a door glass 4. Referring also to FIG. 6, the door main body 2 is constructed by an outer panel 5 and an inner panel 6, and has a guard bar 7 arranged therein in the longitudinal direction or the direction of arrow Y in FIG. 5. A pair of brackets 8 is arranged to the guard bar 7 in a position corresponding to a waist of a seat occupant M.

A door pad of foam resin 9 is arranged in the door main body 2, and serves as a cushion member when the door main body 2 undergoes an external force F from the outside as shown in FIG. 7. Formed with the door pad 9 at an upper end 9a thereof is a mounting lug 10 having small thickness and the same width as the door pad 9, and mounted to the brackets 8 by bolts 11 and nuts 12. A lower end 9b of the door pad 9 is inserted into a groove 13 of a bottom of the door main body 2.

As shown in FIG. 5, four work openings 14, 15, 16, 25 are formed through the inner panel 6. The work opening 25 is used when cabling a lock knob rod 28 and a bell crank 29 to connect an inside handle 26 with a door lock 27. The work opening 16 is arranged for the door pad 9, and has substantially a rectangular shape. A front edge 16a of the work opening 16 is positioned ahead of a corresponding front end of the door pad 9, whereas a rear edge 16b of the work opening 16 is positioned behind a corresponding rear end of the door pad 9. Moreover, an upper edge 16c of the work opening 16 is positioned below an upper end 9a of the door pad 9, whereas a lower edge 16d of the work opening 16 is positioned above a lower end 9b of the door pad 9.

As best seen in FIG. 6, the door trim 3 is mounted to the inner panel 6 on the side of a vehicle room R, and a trim pad 17 having a shape substantially conforming to the work opening 16 is mounted to the door trim 3 in a position corresponding to the work opening 16.

Referring to FIG. 7, when an injurious body G strikes against the door main body 2 from the side thereof so as to apply thereto a predetermined external force F, the outer panel 5 is largely projected into the door main body 2, so that the mounting lug 10 of the door pad 9 is broken, and the door pad 9 is pushed on the side of the vehicle room R. The outer panel 5 is deformed within the range of a door deformation margin $A_1$ which corresponds to the displacement of the outer panel 5 until the door pad 9 comes in contact with the inner panel 6, absorbing energy of the external force F. When coming in contact with the inner panel 6, the door pad 9 is held between the outer panel 5 and the inner panel 6, and crushed. Then, the door pad 9 is deformed within the range of a door pad deformation margin B which corresponds to the thickness of the door pad 5, further absorbing energy of the external force F. Since the door pad 9 as deformed is pressed against the trim pad 17, the latter is also deformed in some degree, which contributes to absorption of energy of the external force F. In such a way, deformation of the outer panel 5 within the range of the door deformation margin $A_1$, deformation of the door pad 9 within the range of the door pad deformation margin B, and deformation of the trim pad 17 in some degree contribute to absorption of energy of the external force F, resulting in a decrease in harmful effect on the seat occupant M.

However, as described hereinbefore, such conventional door for automotive vehicles is constructed so that the door pad 9 pushed by the outer panel 5 comes in contact with the inner panel 6 so as not to move on the side of the vehicle room R, having limited door deformation margin $A_1$ as well as limited absorbable energy amount. An increase in the absorbable energy amount is possible by setting a position of the inner panel 6 nearer to the vehicle room R, whereas an increase in the door deformation margin $A_1$ is possible by enlarging the width of the door main body 2, which is unpreferable, however, since a space of the vehicle room R is decreased.

Further, since the trim pad 17 contacts the door pad 9, the trim pad 17 can be deformed in accordance with a part of the door pad 9 which bends and enters the work opening 16, however, it cannot be expected that the trim pad 17 produces sufficient deformation due to the fact that the door pad 9 comes in contact with the inner panel 5 so as to restrict a further movement thereof as described above.

Furthermore, due to numerous work openings 14, 15, 16, 25 being arranged, the inner panel 6 has increased thickness for ensuring the strength thereof.

Referring next to FIGS. 1–4, the preferred embodiment of a door for automotive vehicles will be described. The general structure of this door is substantially similar to the conventional one.

Figure 2:
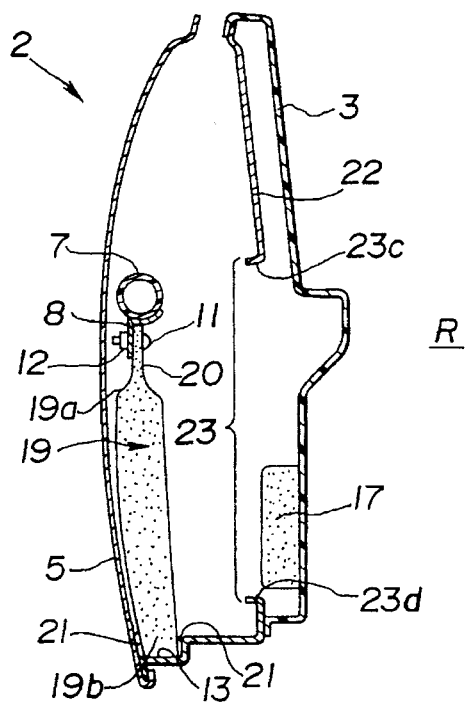
FIG. 2 is a sectional view taken along the line II—II in FIG. 1.

Referring to FIG. 2, a mounting lug 20 having a relatively long size is formed with a door pad 19 at an upper end 19a thereof so as to protrude upward, and mounted to a bracket 8 of a guard bar 7. In the same way as the prior art, the mounting lug 20 has small thickness, and thus can be broken easily. Referring also to FIG. 1, a door pad 19 is inserted into a groove 13 of a bottom of a door main body 2, and has a lower end 19b having both sides on which a pair of protrusions 21 is arranged. The protrusions 21 are in contact with an inner surface of the groove 13, ensuring stabilization of the lower end 19b of the door pad 19 in the groove 13.

Referring always to FIG. 1, a work opening 23 formed through an inner panel 22 of the door main body 2 is large in size, and has an upper edge 23c positioned above the guard bar 7. Since an upper portion of the work opening 23 can be used when carrying out a cabling work of a lock knob rod 28 and a bell crank 29, this embodiment has no work opening exclusive to the lock knob rod 28, which is conventionally arranged. A front edge 23a of the work opening 23 is positioned ahead of a corresponding front end of the door pad 19, a rear edge 23b of the work opening 23 is positioned behind a corresponding rear end of the door pad 19, and a lower edge 23d of the work opening 23 is positioned above the lower end 19b of the door pad 19.

Figure 3:
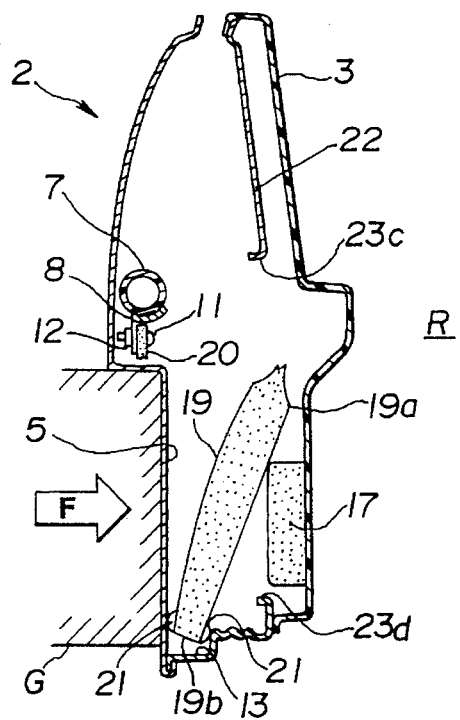
FIG. 3 is a view similar to FIG. 2, showing a mounting lug of a door pad broken.
Figure 4:
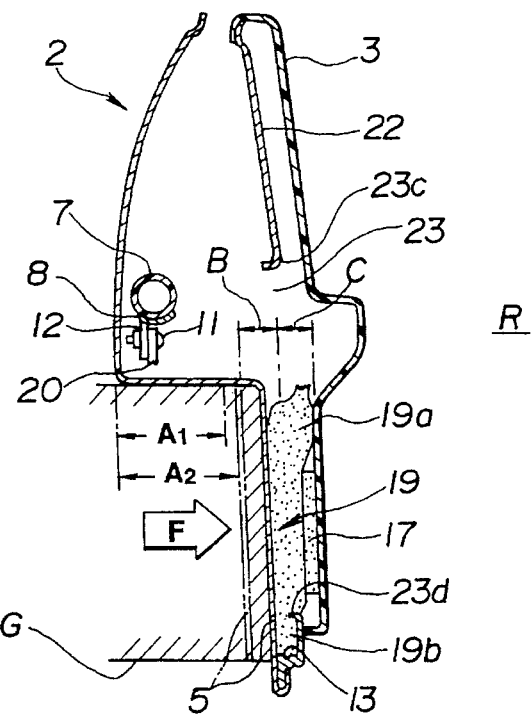
FIG. 4 is a view similar to FIG. 3, showing the door pad and trim pad crushed.

Referring to FIGS. 3–4, a description will be made with regard to a case that an injurious body G strikes against a door 1 from the side thereof.

Referring to FIG. 3, when the injurious body G strikes against the door 1, the outer panel 5 is largely projected into the door main body 2, so that the mounting lug 20 of the door pad 19 is broken, and the door pad 19 is pushed on the side of a vehicle room R. At that time, since the lower end 19b of the door pad 19 is inserted into the groove 13 of the bottom of the door main body 2, and the upper edge 23c of the work opening 23 is positioned fully above the door pad 19, the door pad 19 falls on the side of the vehicle room R on the lower end 19b, and has the upper end 19a entering the work opening 23 as shown in FIG. 3.

Then, referring to FIG. 4, the door pad 19 is continuously pushed by the outer panel 5 on the side of the vehicle room R, coming in close contact with a trim pad 17. The displacement of the outer panel 5 until the door pad 19 comes into close contact with the trim pad 17 corresponds to a door deformation margin $A_2$ in this embodiment. Since the lower end 19b of the door pad 19 comes in contact with the inner panel 22, and most of the other portions thereof can enter the work opening 23 without coming in contact with the inner panel 22, the door deformation margin $A_2$ is substantially enlarged as compared with the conventional door deformation margin $A_1$. Accordingly, energy of the external force F can fully be absorbed during the dispacement of the outer panel 5 within the range of the door deformation margin $A_2$. After being deformed in accordance with the door deformation margin $A_2$, the outer panel 5 crushes the door pad 19 and the trim pad 17 together as shown in FIG. 4, further absorbing energy of the external force F. This crush is relevant to not only the door pad deformation margin B corresponding to the thickness of the door pad 19, but the trim pad deformation margin C corresponding to the thickness of the trim pad 19, resulting in excellent energy absorption. It is to be noted that in FIG. 4, the position of the outer panel 5 indicated by the imaginary line or two-dot chain line shows that one when starting to crush the door pad 19.

As described above, according to this embodiment, the door deformation margin $A_2$ and the trim pad deformation margin C can be enlarged, resulting in a decrease in harmful effect on the seat occupant M.

Having described the present invention in connection with the preferred embodiment, it is to be noted that the present invention is not limited thereto, and various changes and modifications are possible without departing from the spirit of the present invention. By way of example, in this embodiment, two brackets 8 are arranged to the guard bar 7, alternatively, one or three or more brackets 8 may be arranged thereto. Alternatively, the door pad 19 may directly be mounted to the guard bar 7 without arranging any bracket 8.

Further, in this embodiment, the mounting lug 20 has small thickness, and the same width as the door pad 19. Alternatively, the mounting lug 20 may be thick if forming of recesses or the like makes it easy to break. As to the width, there is no need to have the same width as the door pad 19, and a plurality of narrow mounting lugs 20 may be arranged to correspond to the number of the brackets 8.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. A door for an automotive vehicle, the automotive vehicle having a vehicle room and a seat, comprising:

a door main body including an outer panel and an inner panel;

a guard bar arranged in said door main body in a longitudinal direction thereof;

a door pad arranged in said door main body in a position corresponding to the seat, said door pad having front, rear, upper and lower ends, said lower end of said door pad being inserted into a groove of a bottom of said door main body;

a mounting lug arranged to said door pad at an upper end thereof, said mounting lug being mounted to said guard bar; and means for defining an opening corresponding to said door pad, said opening defining means having a front edge positioned ahead of said front end of said door pad, a rear edge positioned behind said rear end of said door pad as viewed in a longitudinal direction of the automotive vehicle, and an upper edge positioned above said upper end of said door pad.

2. A door as claimed in claim 1, wherein:

said upper edge of said opening defining means is positioned above said guard bar.

3. A door as claimed in claim 1, wherein:

said guard bar is provided with at least one bracket, and said mounting lug of said door pad is mounted to said at least one bracket.

4. A door as claimed in claim 1, wherein:

said opening defining means includes said inner panel.

5. A door as claimed in claim 1, further comprising:

a door trim arranged to said inner panel on a side of the vehicle room; and a trim pad arranged to said door trim in a position corresponding to said opening defining means.

6. A door as claimed in claim 1, wherein:

said lower end has two sides, each having at least a pair of protrusions arranged thereon.

* * * * *